United States Patent
Erden et al.

(10) Patent No.: US 11,966,623 B2
(45) Date of Patent: Apr. 23, 2024

(54) INCREASED AERIAL DENSITY CAPABILITY IN STORAGE DRIVES USING ENCODED DATA PORTIONS WRITTEN TO MEDIA SURFACES WITH DIFFERENT AERIAL DENSITY CAPABILITIES

(71) Applicant: Seagate Technology LLC, Fremont, CA (US)

(72) Inventors: Mehmet Fatih Erden, St. Louis Park, MN (US); Mark A. Gaertner, St. Paul, MN (US); Raye A. Sosseh, Minneapolis, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 89 days.

(21) Appl. No.: 17/718,089

(22) Filed: Apr. 11, 2022

(65) Prior Publication Data
US 2023/0325107 A1  Oct. 12, 2023

(51) Int. Cl.
G06F 3/06 (2006.01)

(52) U.S. Cl.
CPC .......... *G06F 3/0655* (2013.01); *G06F 3/0608* (2013.01); *G06F 3/0679* (2013.01)

(58) Field of Classification Search
CPC .... G06F 3/0608; G06F 3/0679; G06F 3/0655; G06F 3/0676
USPC ........................................................ 711/201
See application file for complete search history.

(56) References Cited

U.S. PATENT DOCUMENTS

| | | | |
|---|---|---|---|
| 8,941,937 B1 | 1/2015 | Toribio et al. | |
| 9,312,886 B2 | 4/2016 | Patapoutian et al. | |
| 9,734,848 B1 | 8/2017 | Varnica et al. | |
| 10,090,010 B1 | 10/2018 | Erden | |
| 2007/0025006 A1 | 2/2007 | Ichihara | |
| 2018/0059955 A1* | 3/2018 | Moon | G06F 3/0685 |
| 2019/0392862 A1* | 12/2019 | Liu | G11B 20/10009 |
| 2023/0267076 A1* | 8/2023 | Hall | G06F 3/0676 711/4 |

* cited by examiner

*Primary Examiner* — Hashem Farrokh
(74) *Attorney, Agent, or Firm* — HOLZER PATEL DRENNAN

(57) ABSTRACT

Optimization of an aerial density capability (ADC) leveraging different qualities of media surfaces to which sub-portions of an encoded data portion are written. That is, data may be encoded to generate an encoded data portion according to a coding scheme. In turn, the encoded data portion may be divided into a plurality of sub-portions, each of which may be written to different media surfaces in a storage drive. The sub-portions may be read from the different media surfaces and combined to generate a recreated encoded data portion that is decoded using the coding scheme. As the encoded data portion is divided into sub-portions, the combined sub-portions may provide different error rates or signal-to-noise ratios that may allow for lower quality sub-portions to be assisted during the decoding process by higher quality sub-portions.

20 Claims, 4 Drawing Sheets

INCREASED AERIAL DENSITY CAPABILITY IN STORAGE DRIVES USING ENCODED DATA PORTIONS WRITTEN TO MEDIA SURFACES WITH DIFFERENT AERIAL DENSITY CAPABILITIES

SUMMARY

A first aspect of the present disclosure includes a method of storage of data on a storage drive for improved composite aerial density capability (ADC) relative to a plurality of media surfaces. The method includes encoding a data portion into an encoded data portion using an encoder of a coding scheme. The method also includes dividing the encoded data portion into a plurality of write sub-portions and writing each of the plurality of write sub-portions onto different respective media surfaces of the storage drive. The different respective media surfaces of the storage drive comprise different quality characteristics supporting different ADCs. The method also includes reading a plurality of read sub-portions from the different respective media surfaces of the storage drive and combining the plurality of read sub-portions to generate a recreated encoded data portion. In turn, the method includes decoding the recreated encoded data portion using a decoder of the coding scheme.

Another aspect of the present disclosure includes a storage drive with storage of data for improved composite aerial density capability (ADC). The storage drive includes a plurality of different media surface of the storage drive comprising different quality characteristics supporting different ADCs. The storage drive also includes a plurality of different media surfaces. The storage drive includes an encoder for application of a coding scheme to a data portion to generate an encoded data portion. The storage drive also includes a sub-portion manager operative to divide the encoded data portion into a plurality of write sub-portions for writing the write sub-portions to different respective media surfaces of the plurality of different media surfaces, reading a corresponding plurality of read sub-portions from the different respective media surfaces of the plurality of different media surfaces, and combining the plurality of read sub-portions to generate a recreated encoded data portion. The storage drive also includes a decoder corresponding to the coding scheme for decoding the recreated encoded data portion.

Another aspect of the present disclosure includes one or more tangible processor-readable storage media embodied with instructions for executing on one or more processors of a device a process for storage of data for improved composite aerial density capability (ADC). The process includes encoding a data portion into an encoded data portion using an encoder of a coding scheme. The process also includes dividing the encoded data portion into a plurality of write sub-portions and writing each of the plurality of write sub-portions onto different respective media surfaces of the storage drive. The different respective media surfaces of the storage drive comprise different quality characteristics supporting different ADCs. The process further includes reading a plurality of read sub-portions from the different respective media surfaces of the storage drive and combining the plurality of read sub-portions to generate a recreated encoded data portion. The process also includes decoding the recreated encoded data portion using a decoder of the coding scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
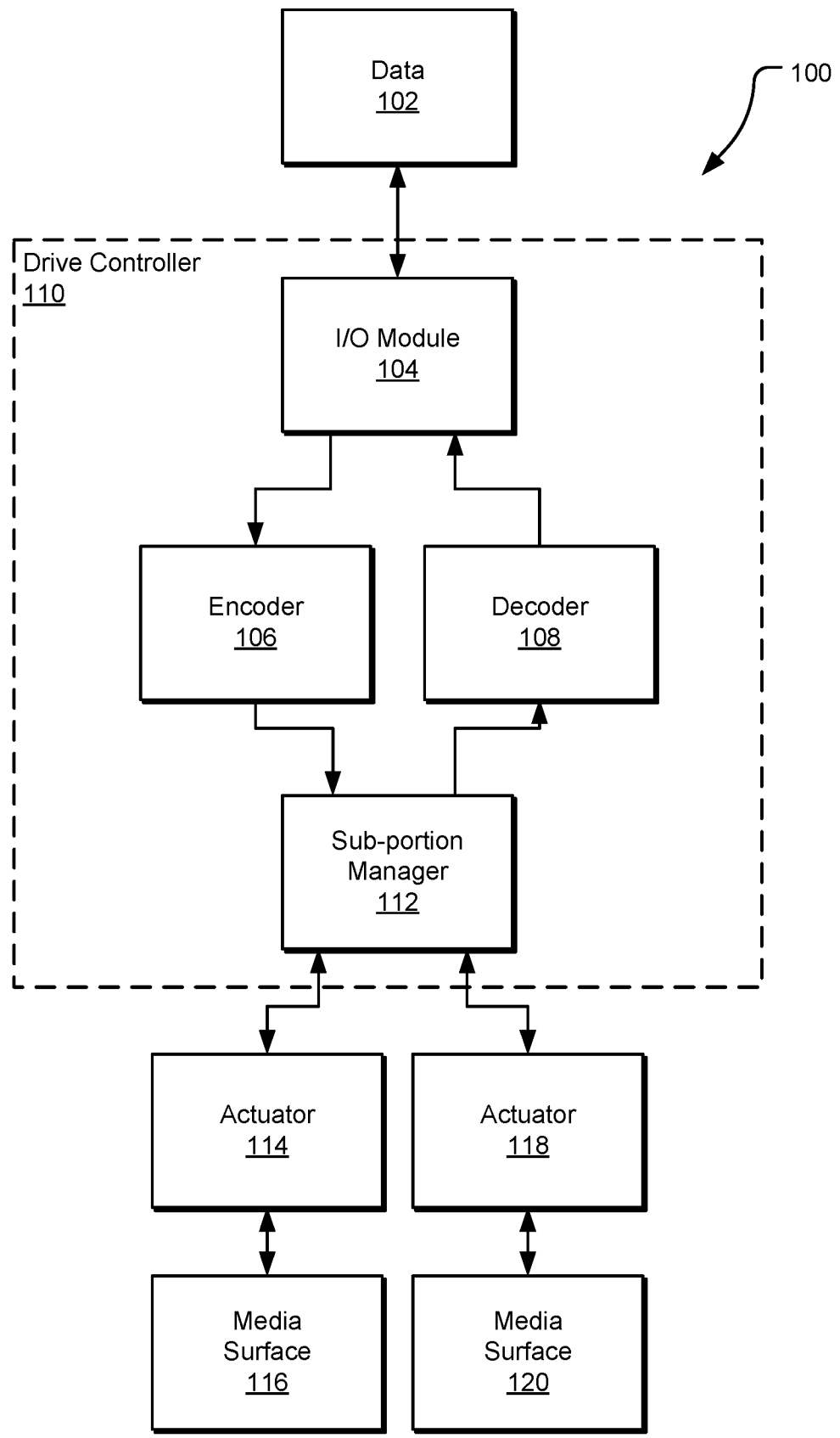
FIG. 1 includes a schematic figure of an example storage drive according to the present disclosure.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present disclosure generally relates to storage of data in a storage drive that leverages different aerial density capabilities (ADCs) of different media surfaces to improve a composite ADC based on a combined performance of a plurality of media surfaces. Specifically, the present disclosure utilizes an encoded data portion that is divided into a plurality of sub-portions. The encoded data portion is a unified portion of encoded data that is encoded using a given coding scheme. The plurality of sub-portions that comprise parts of the encoded data portion are written to different media surfaces in a drive. In turn, when the sub-portions are read to recreate a recreated encoded data portion, the recreated encoded data portion can be decoded to provide the original data. As will be appreciated more fully in the disclosure below because the recreated encoded data portion includes sub-portions of the encoded data portion from a plurality of media surfaces, when decoding the recreated encoded data portion, signal quality of sub-portions from higher quality media surfaces may be used to improve the decoding of sub-portions from lower quality media surfaces. That is, because a diversity of media surfaces are used, media surfaces with a given ADC may be leveraged to improve the ability to decode data from media surfaces with a different ADC such that composite performance based on operations to a plurality of media portions may improve the overall ADC of the storage drive.

In a conventional storage system that employ hard disk drive (HDD) storage, the drive receives requests to write data to or read data from the drive. In this disclosure, data reads and data writes may be collectively referred to as storage operations. In any regard, to execute a storage operation, the data may comprise a data block. If a request is received to write the data block, the drive (e.g., a drive controller or the like) divides the block into smaller portions of data, referred to as data sectors. The drive then encodes each sector and writes the data to storage media of the drive using a write head. A coding scheme may include an error correction code (ECC). If a request is received to read data from the drive, a read head reads the sector from the storage media and sends the data read from the storage media through a detector and decoder. In turn, once read and decoded, the data sectors to be used to form the block requested in the read request are combined and returned in response to the read request.

Drive capacity (e.g., the amount of data a storage drive may store) as well as drive performance (e.g., the speed at which data may be written to or read from the storage drive) are important design parameters for HDDs. Recent advances have provided gains in drive capacity. However, drive performance tended to lag the advances in drive capacity. As such, drive performance presented a problem in that transfer times per drive capacity fell. This resulted in decreased performance and limitations on storage drives.

Accordingly, approaches have been proposed that utilize independent control of a plurality of actuators for writing data to and reading data from storage media in a storage drive. Examples of this approach may activate more than one actuator to perform storage operations on different media surfaces at the same time. In turn, increases the write and read performance may be obtained by allowing more data to be read or written from the storage media of a drive at the same time. In this regard, such independent control of a plurality of actuators for performing operations on multiple drive surfaces at the same time has primarily resulted in improvements in drive performance. However, in such proposed storage drives with independent actuator control, each actuator is still used to write or read entire encoded user sectors to a given media surface. As such, even though drive performance may be increased, drive capacity is still limited by the maximum ADC that can be independently achieved at each respective media surface.

As will be appreciated in the description below, the present disclosure may leverage separate storage operations performed relative to different media surfaces. In an example, the separate storage operations may be performed by independent control of a plurality of actuators for writing data to or reading data from storage media in a storage drive. In another example, the separate storage operations may include an actuator with a plurality of subactuators that can independently control storage operations (e.g., within a limited physical range as controlled by the actuator. In any regard, the present disclosure may be utilized in any storage drive or system in which separate storage operations are performed in relation to different media surfaces without limitation to the specific technology or methodology employed to realize such independent storage operations.

Returning to operation of conventional drives, different read/write heads are provided that each access a different media surface of each magnetic disk of the storage drive. For example, for a 10-disk drive, there are 20 media surfaces and 20 different arms, which may include a single write-read pair that is used to read data from and write data to a given media surface of the drive. While each surface includes a corresponding write-read head, the arms are all controlled via a single actuator to position the arms with respect to the storage media. In turn, only one of the plurality of write-read heads is active at a given time to write data to or read data from a single media surface at any given time.

As such, in prior approaches, drive components (e.g., media surfaces, write heads, read heads, etc.) are all designed to support an aerial density capability (ADC), which may be calculated based on tracks per inch (TPI) and bits per inch (BPI). As there are natural variations in the quality of the various components, the ADC may be optimized to provide as large an ADC as is possible for a given surface while maintaining drive performance. For example, as the ADC increases with increased TPI and BPI for a media surface, the signal to noise ratio (SNR) of the data read from the media surface may decrease. That is, increased ADC may result in a greater number of errors when writing data to or reading data from the media surface. Accordingly, different media surfaces may be individually tuned to support as large an ADC as is possible while maintaining the ability to successfully recover data from the media surface (e.g., using ECCs or the like).

As one example, a sector failure rate (SFR) may be measured during drive operation to quantify an error rate or a SNR with respect to a given media surface. In this example, the ADC for the surface may be optimized using a Variable Bit Aspect Ratio (VBAR) methodology at each media surface based on the SFR of the media surface. This may result in each media surface operating at different TPI and BPI values (and, in turn, different ADCs) based on the quality of the media surface in conjunction with the writer and reader operating relative to the media surface. That is, a higher quality media surface may support a higher ADC while providing sufficient SNR to allow for data to be successfully written to and read from the surface, whereas a lower quality surface may require a lower ADC to provide sufficient SNR to allow for data to be successfully written to and read from the surface. By individually controlling the ADC of each surface independently, the drive capacity is set to meet target parameters in relation to the ability to write and read data (e.g., as measured by SNR, error rates, SFR, or the like).

Storage drives may also employ a coding scheme (e.g., including a corresponding encoder and decoder) to provide error correction capability that allows for higher ADC while still being capable of successfully recovering data. As an example, a data sector may be encoded using an ECC such as a low-density parity check (LDPC) code. In a LDPC approach, information (e.g., parity bits or the like) is encoded with the user data that may facilitate correction of errors within the user data. Thus, even in the events that errors are experienced when writing or reading data from the media surface or the SNR for the data decreases, such errors may be corrected using the ECC. Such ECCs may have a limited capability to correct errors such that data with a SNR below some threshold may not be corrected.

The present disclosure generally utilizes a coding scheme such as an ECC or the like in combination with the capability to separately write data to or read data from a plurality of media surfaces of different qualities to allow for optimized ADC across a plurality of media surfaces. That is, instead of writing a unitary encoded portion entirely on a given media surface with individually optimized ADC, the present disclosure encodes a data portion and then divides each unified encoded data portion such that sub-portions comprising parts the unified encoded data portion are written to different media surfaces. In turn, this may leverage the varying media surface qualities to improve recovery of the data through use of sub-portions of the unified encoded data portion retrieved from different media surfaces. That is, within a given encoded data portion, some sub-portions of the data may have a higher SNR than other sub-portions of the data such that, once combined, the sub-portions of the encoded data portion with higher SNR may be used to correct errors in other sub-portions of the encoded data portion using the coding scheme. In turn, composite performance based on decoding combined sub-portions from a plurality of different media surfaces may be used to improve the ADC in view of the composite performance.

In an example, each of the sub-portions comprising parts of the encoded data portion are then written to different respective surfaces using independently controlled readers/writers. Thus, the overall ability to decode data read from the drive will be dependent on multiple surfaces with multiple writers and readers operating with respect to the multiple surfaces. In turn, the coding scheme used to encode the data may allow a sub-portion with a high SNR to be used to recover data from a different sub-portion with a lower SNR. As such, the ADC of lower quality media surfaces may be increased more than in traditional approaches in which an entire encoded portion is written to the lower quality media surface because errors in data from the lower quality media surface may be correctable based on another sub-portion of the encoded data portion written to and read from a higher quality surface with a higher SNR (e.g., a lower error rate). That is, use of a higher quality media surface to store a sub-portion of an encoded data portion may compensate for errors in another sub-portion stored on a lower quality media surface. In turn, optimization of the ADC of the media surfaces using a VBAR algorithm based on SFR may use the multiple signals coming from each surface to allow for increased ADCs across all media surfaces rather than each individual surface being limited by its quality. This provides better optimization of the ADC of the plurality of surfaces as the encoded sector portions may be decoded in a manner that the higher quality media surface provides a bootstrapping or enhanced error recovery to another encoded sector portion stored to a lower quality media surface.

Turning to FIG. 1, an example of a storage device 100 according to the present disclosure is shown. The storage device 100 may receive data 102 at an input/output (IO) module 104 of the drive. The data 102 may include a logical block address (LBA) and length associated with the data 102 that may be used by the storage drive 100 in the management of the storage of the data 102. The IO module 104 may divide the data 102 into data sectors. In turn, the IO module 104 may provide a data sector to an encoder 106.

The encoder 106 may be a channel encoder that may encode the data sector received from the IO module 104 to generate an encoded data portion. The encoding applied by the encoder 106 may correspond to an ECC. As noted above, in an example, the ECC may comprise a low-density parity check (LDPC) code. In other examples, the ECC may comprise any other block or convolutional codes such as, for example, Reed-Solomon coding, BCH codes, multidimensional parity, or Hamming codes. In any regard, the encoder 106 may provide the encoded data portion to a sub-portion manager 112.

The sub-portion manager 112 may be operative to further divide the encoded data portion into a plurality of write sub-portions to be written to the storage media of the drive. In turn, read sub-portions corresponding to the write sub-portions may be later read from the media surfaces. Write sub-portions may be distinguished from read sub-portions, in that read sub-portions provided to a decoder or the like may not correspond to write sub-portions due to the presence of errors or noise in the data.

In any regard, the write sub-portions created by the sub-portion manager 112 may comprise equal parts such that each write sub-portion is the same size as the other write sub-portions for a given encoded data portion. In other examples, write sub-portions may be created that have different respective sizes. The sub-portion manager 112 may cause each write sub-portion to be written to different respective media surfaces of the storage drive. For example, FIG. 1 illustrates a first actuator 114 corresponding to a first media surface 116 and a second actuator 118 corresponding to a second media surface 120. The first actuator 114 may comprise an independently controllable arm comprising a reader and a writer that may be used to write data to and read data from the first media surface 116 associated with the first actuator 114. However, as noted above, the present disclosure may also be applicable to other drive architectures that may facilitate separate storage operations with respect to different media surfaces.

The first actuator 114 and the first media surface 116 may have a first quality that reflects the ability to write data to and read data from the first media surface 116. The second actuator 118 may comprise an independently controllable arm comprising a reader and a writer that may be used to write data to and read data from the second media surface 120 associated with the second actuator 118. As such, the second actuator 118 and the second media surface 120 may have a second quality that reflects the ability to write data to and read data from the second media surface 120. The first actuator 114 may be independently controlled form the second actuator 118 such that the first actuator 114 and the second actuator 118 may simultaneously perform operations relative to the first media surface 116 and the second media surface 120, respectively. As used herein, "simultaneously" refers to operations that may occur in an at least partially overlapping time period. That is, operations performed simultaneously need not commence at the same time nor conclude at the same time, although such operations may commence at the same time and/or may conclude at the same time. Rather, simultaneous is intended to refer to at least one common time period in which operations are both occurring.

Also, while two actuators and media surfaces are shown in FIG. 1 for purposes of illustration, it may be appreciated that additional actuators and/or media surfaces may be provided without limitation. Moreover, actuators need not exclusively be associated with a given media surface such that a given actuator may perform read and/or write operations with respect to a plurality of media surfaces.

In any regard, the sub-portion manager 112 may provide respective ones of the plurality of write sub-portions corresponding to the encoded data portion to different ones of the first actuator 114 and the second actuator 118. In this regard, a first write sub-portion may be written to the first media surface 116 and a second write sub-portion may be written to the second media surface 120. Writing of the first write sub-portion to the first media surface 116 may occur in at least a partially overlapping time period to the second write sub-portion being written to the second media surface 120.

Furthermore, the sub-portion manager 112 may control the reading of read sub-portions by directing the first actuator 114 and the second actuator 118 to read data from the first media surface 116 and the second media surface 120. As noted above, the read sub-portions may correspond to the write sub-portions written to the respective media surfaces. However, a given read sub-portion may differ from the write sub-portion due to errors introduced into the data during the writing and/or reading process.

The sub-portion manager 112 may be operative to retrieve the respective read sub-portions corresponding to requested data in a read request and combine the read sub-portions from the different media surfaces to generate a recreated encoded data portion. Again, the recreated encoded data portion may differ from the encoded data portion due to errors or noise introduced during the reading and/or writing operations. In turn, the sub-portion manager 112 may pass the recreated encoder sector to a decoder 108. The decoder 108 may be operative to decode the recreated encoded sector to generate the data sector originally encoded in response to a read request for the data sector. In turn, the decoder 108 may provide the data sector to the I/O module 104 for response to a read request for the data sector.

The system 100 of FIG. 1 may leverage different qualities of the first media surface 116 and the second media surface 120 on which respective write sub-portions are written. That is, it may be appreciated that the respective media surfaces may have different characteristics or qualities that may support different ADCs. However, as parts (e.g., sub-portions) of the encoded data portion may be divided across multiple media surfaces, lower quality media surfaces may be operated at higher ADCs than if operated independently because the higher quality media surfaces may allow for correction of errors in the read sub-portion from a lower quality media surface. Stated differently, even in the event that one of the media surfaces produces a greater number of errors at a given ADC than would otherwise be acceptable, because the encoded data portion may be split among a plurality of various media surfaces, another of the media surfaces to which a sub-portion of the encoded data portion is written may allow for sufficient error correction of the read sub-portion from a lower quality media surface.

As shown in FIG. 1, the IO module 104, the encoder 106, the decoder 108, and the sub-portion manager 112 may generally comprise a part of a drive controller 110. In this regard, the drive controller 110 may include processors and/or memory for use in controlling the operation of the drive. As such, the IO module 104, the encoder 106, the decoder 108, and the sub-portion manager 112 may be executed by the processor of the drive controller 110 or may be stand-alone modules with dedicated processors and/or memory. In addition, the encoder 106 and decoder 108 may be provided as a unitary encoder/decoder that provides both encoding and decoding operations according to the coding scheme.

Figure 2:
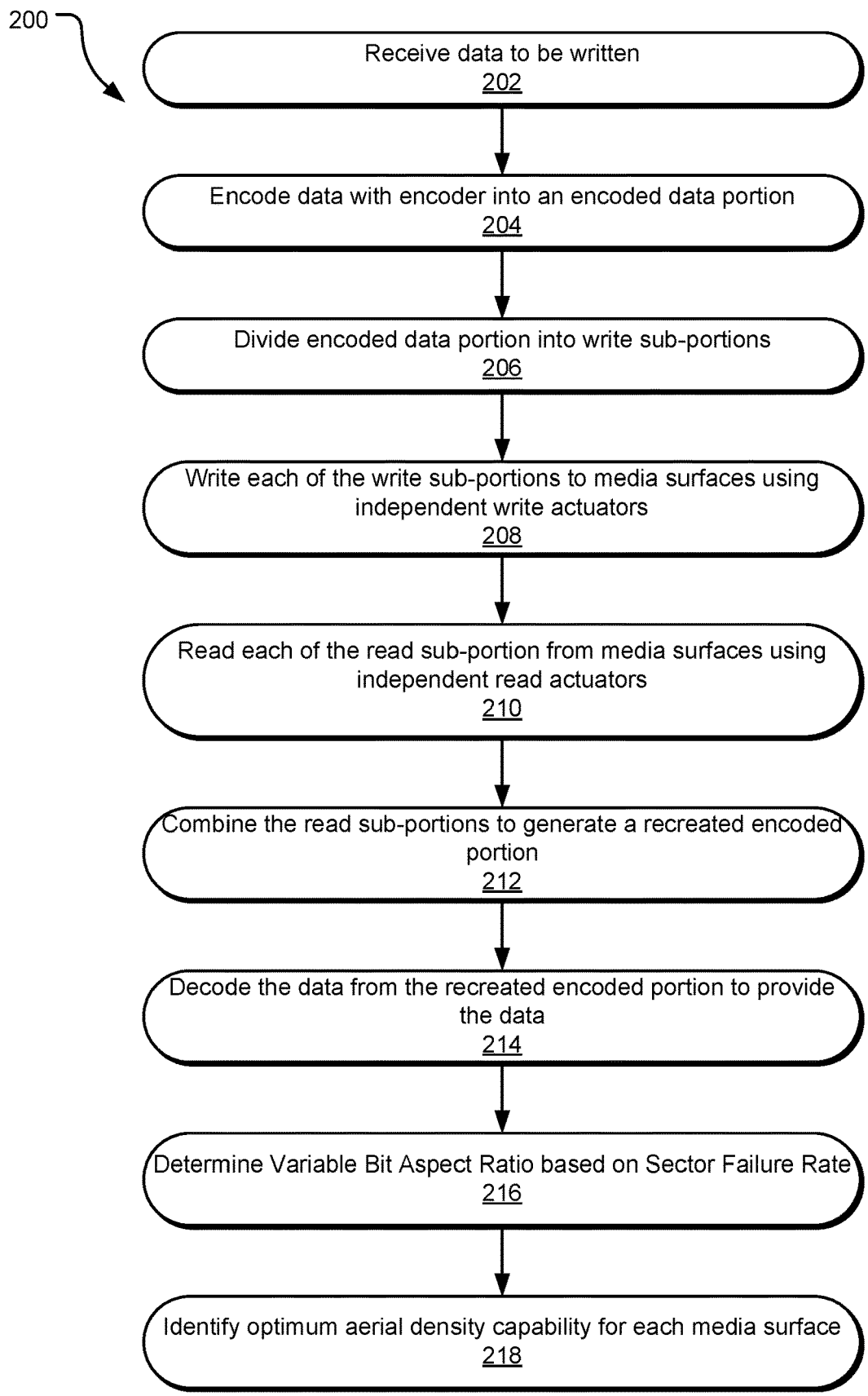
FIG. 2 includes a flowchart depicting an example of a process for storage of data to increase ADC according to the present disclosure.

FIG. 2 depicts an example process 200 according to the present disclosure. The process 200 may include a receiving operation 202 in which a data sector to be written to storage media of a drive is received. The operations 200 may include an encoding operation 204 in which the data sector is encoded to generate an encoded data portion. As described above, the encoding operation 204 may employ an ECC such that the data sector to be written to memory is encoded according to the ECC.

The process 200 also includes a dividing operation 206 in which the encoded data portion is divided into a plurality of write sub-portions. As described above, the write sub-portions may be equally divided in the dividing operation 206 or may be divided into differently sized write sub-portions. Moreover, while shown in the present disclosure (e.g., in FIG. 3) as being divided into two sub-portions, it may be appreciated that the encoded data portion may be divided into more than two sub-portions for storage on more than two different media surfaces. In an example, the number of write sub-portions created in the dividing operation 206 may correspond to the number of independently addressable media surfaces in a storage drive. In other examples, the number of write sub-portions resulting from the dividing operation may include a lower number of write sub-portions than the available number of independently addressable media surfaces, but at least including two write sub-portions.

In any regard, the operations 200 may include a writing operation 208 in which each of the write sub-portions are written to different respective media surfaces of the storage device using independently operable write heads. As may be appreciated, each of the media surfaces onto which respective ones of the write sub-portions are written in the writing operation 208 may have different qualities that exhibit different SNRs and/or have different ADCs.

The operations 200 may include a reading operation 210 in which read sub-portions may be read from the respective storage services on which the read sub-portions are stored using independently operable read actuators. The process 200 may include a combining operation 212 in which the read sub-portions read from the respective media surfaces are combined to generate a recreated encoded sector. In turn, decoding operation 214 may be applied to the recreated encoded data sector to decode the data sector from the recreated encoded sector using the ECC.

As may be appreciated, the recreated encoded data sector includes read sub-portions from different media surfaces. Thus, a read sub-portion from a lower quality media surface may have a lower SNR or a higher error rate than another read sub-portion from a higher quality media surface. However, as the ECC is applied to the data portion as a whole, the read sub-portion with the higher error rate may be correctable in view of the other read sub-portion from the higher media surface. In an example, the read sub-portion from the lower quality media surface may have a SNR or error rate that, absent the other read sub-portion, may not be recoverable by the ECC utilized. In this regard, the ADC of the lower quality portion may be maintained at a higher level than would otherwise be possible if the lower quality storage portion was alone used to store an entire encoded data portion.

The process 200 may also include operations that may determine an optimum ADC in view of the composite performance across the different media surfaces in view of the leveraged qualities of the different media surfaces. For example, a determining operation 216 may be utilized to determine a variable bit aspect ratio based on a sector failure rate in view of the decoding operation 214 applied to combined read sub-portions retrieved from different media surfaces. The variable bit aspect ratio determined in the determining operation 216 may be utilized in optimization operation 218 that identifies an optimum ADC for each of the media surfaces used to store the read sub-portions comprising the data that was decoded in the decoding operation 214. In an example, the determining operation 216 and the optimization operation 218 may be performed by the drive controller 110.

Figure 3:
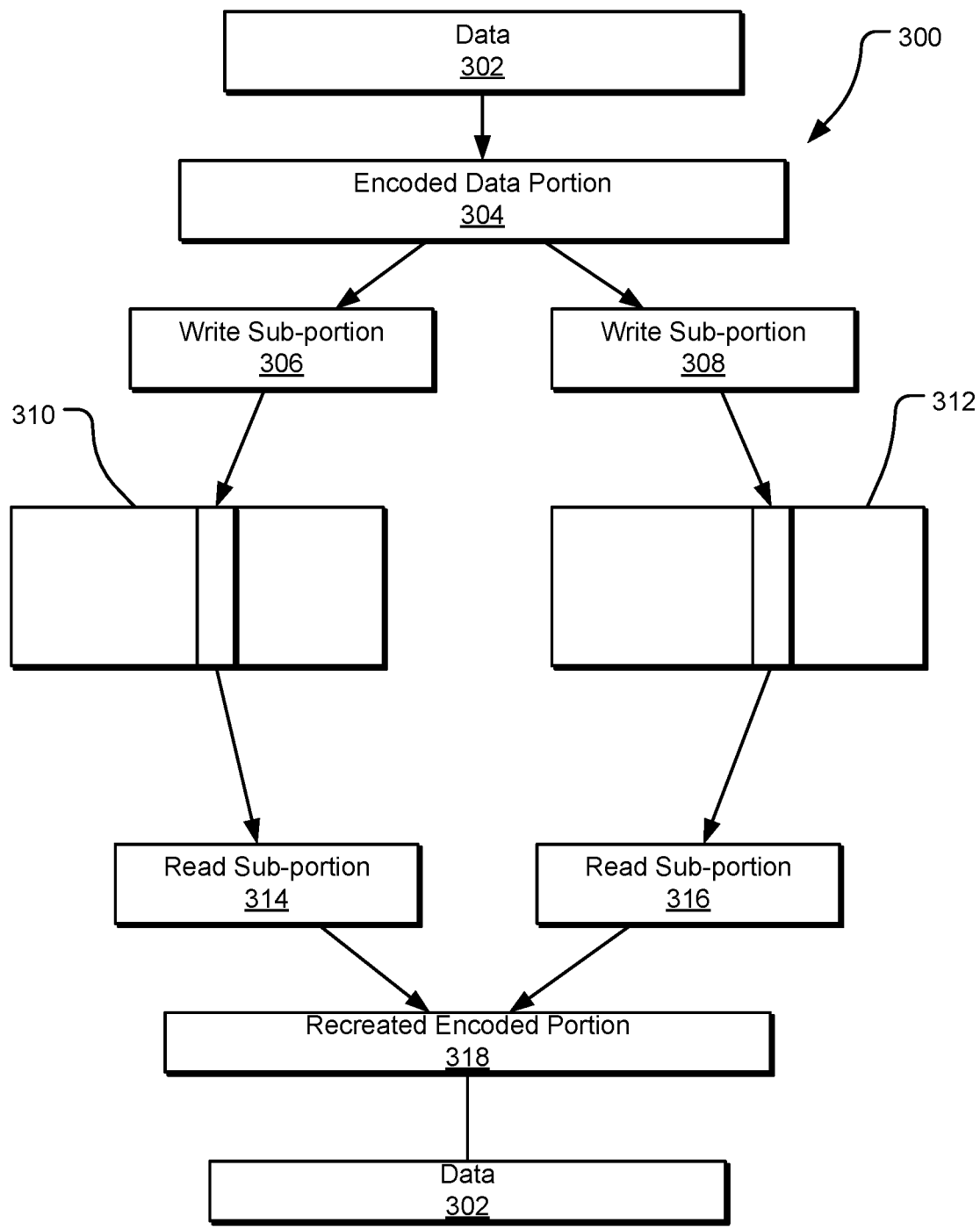
FIG. 3 includes a schematic illustration of an example of different encoded data portions being written to and read from different media surfaces for improved ADC.

With further reference to FIG. 3, a schematic representation of an example of the present disclosure is illustrated. Specifically, data 302 is encoded using a coding scheme to generate an encoded data portion 304. The encoded data portion 304 may be divided into at least the first write sub-portion 306 and a second write sub-portion 308. The first write sub-portion 306 may be written onto a first media surface 310, and the second write sub-portion 308 may be written to a second media surface 312. Specifically, the first write sub-portion 306 may be written to the first media surface 310 in an overlapping time period of the second write sub-portion 308 being written to the second media surface 312. As may be appreciated, the first media surface 310 and the second media surface 312 may have different qualities. As such, in response to a read request, a first read sub-portion 314 correspond to the first write sub-portion 306 may be read from the first media surface 310. Additionally, a second read sub-portion 316 may be read from the second media surface 312 that corresponds to the second write sub-portion 308. In turn, the first read sub-portion 314 and the second read sub-portion 316 may be combined to generate a recreated encoded portion 310. The re-created encoded sector 310 may be decoded to produce the data sector 302.

A number of different example approaches may be utilized that each facilitate the increased composite ADC using sub-portions of an encoded data portion written across a plurality of media surfaces. In a first example, the first write sub-portion 306 and the second write sub-portion 308 may be randomly written to the first media surface 310 and the second media surface 312 without factoring the specific qualities of the first media surface 310 or the second media surface 312. That is, the write sub-portions may be written to different media surfaces (e.g., as directed by a sub-portion manager) without regard to the qualities of the media surfaces to which they are written and without regard to the nature of the write sub-portions themselves. Rather, any inherent differences between the qualities of the media surfaces are utilized provide the benefits with respect to recovering data utilizing a coding scheme and optimizing a composite ADC across all the media surfaces as noted above.

In a second example, the qualities or characteristics of the first media surface 310 and the second media surface 312 may be controlled to provide different ADCs. In this example, the first media surface 310 may be maintained at a nominal ADC and the second media surface 312 may be controlled to have an increased ADC (e.g., relative to a nominal ADC value that would otherwise be provided if an entire encoded data portion were to be written entirely to the second media surface 312). In this regard, it may be appreciated that the SNR of the second media surface 312 having the increased ADC may be lower such that an increased error rate may be experienced for data written to and read from the second media surface 312. However, as the first media surface 310 may be maintained at a nominal ADC that provides enhanced capability to correct any such errors in a read sub-portion from the second media surface 312, a recreated encoded data portion 318 created from the combined first read sub-portion 314 and the second read sub-portion 316 may still be recovered in the decoding process. In this regard, the ADC of the storage drive having a plurality of different media surfaces may be increased through the intentional increasing of the ADCs of a given number of stored surfaces even though it is understood that the SNR may be decreased for such storage services.

In a third example, the content of the write sub-portions may be utilized to determine which media surface a given write sub-portion is to be written to in the storage drive. As an example, it may be possible to identify certain bit patterns within a given write sub-portion that may be more difficult to correct or decode using the coding scheme. Such write sub-portions may be referred to as problematic write sub-portions. In this regard, problematic write sub-portions with harmful bit patterns that are identified within the write sub-portion may be written to a media surface with a lower or nominal ADC to help preserve the ability to decode the problematic bit patterns in the write sub-portion. However, write sub-portions with less harmful patterns or that are not problematic (e.g., are it easier to converge when decoding using the decoder) may be written to stored surfaces with higher ADCs that may experience a lower SNR or increased error rate. In this example, the sub-portion manager 112 may be tasked with identifying portions with harmful patterns for targeted writes to media surfaces with lower or nominal ADCs.

The harmful bit patterns may be quantified or identified through any number of potential approaches. In one example, a number of bit transitions within a write sub-portion may be determined such that if the number of bit transitions exceeds some threshold value, the write sub-portion may be determined to be a problematic write sub-portion that is targeted to be written to a media surface with a nominal or lowered ADC. Alternatively or additionally, other predetermined bit patterns may be identified that may signify a problematic write sub-portion. Identifying harmful patterns for a given coding scheme may be accomplished offline such that predetermined conditions are provided to identify a problematic write sub-portion.

In this third example, additional information may be appended to the write sub-portions to assist in determining where the write sub-portion is to be written to and/or read from in the storage drive. That is, this additional information may be considered "bookkeeping" information that must be appended to the write sub-portion to provide information needed to execute the targeting of a write sub-portion to a given media surface. As such, additional bits may be added to the write sub-portion, which increases the overall size of the data to be written to the media surface.

An example of such bookkeeping data is illustrated in a storage system in which the number of media surfaces need not be equal to the number of write sub-portions. In this example, an uncoded data portion may have size of 4 KB (which is 4096*8 bits or 32768 bits). After LDPC encoding, the length of the encoded data portion may increase to 40000 bits with the addition of parity bits used for error correction. In this example, it may be that there are two media surfaces available for data to be written. As such, the write sub-portion for the encoded data portion may each have a size of 20000 bits. In this example, because there are only two available media surfaces on which to write the write sub-portions, this example may only include 2 additional bookkeeping bits (e.g., b1 and b2) of additional data to be stored. That is, the bookkeeping bits may identify where the corresponding portion written. That is, if b1=1, the write sub-portion may be written to a first media surface, otherwise the write sub-portion may be written to a second media surface. However, in this example, the disadvantage may be that the 20000 bit size of each write sub-portion is a relatively large number that may statistically have very similar numbers of harmful patterns in both write sub-portions created. Thus, not much advantage may be provided as each write sub-portion may be similarly difficult to decode based on the statically similar bit pattern.

In another example, the encoded data portion may be divided into 400 write sub-portions each of which has a size of 100 bits. The advantage of the greater number of write sub-portions is that the 100 bit size of each write sub-portion makes it easier to identify more or less harmful bit patterns in each write sub-portion. Thus, writing the write sub-portions determined to be problematic write sub-portions having difficult to decode bit patterns on a media surface with lower or nominal ADC will provide a distinct benefit to decoding those problematic write sub-portions, while writing the others of the write sub-portions not determined to be problematic on a media surface with a higher ADC. However, this approach in which 400 write sub-portions are created may include 400 additional bookkeeping bits to be added to assist in management which of the media surfaces each portion is written. Thus, this approach may include 400 bookkeeping bits per 40000 encoded data bits, thus resulting in a 1% increase in the size of data to be stored. Thus, there may be a practical limit to the number of write sub-portions created such that the benefit of increased decoding capability is weighted against the commensurate increase in bookkeeping bits required to manage the increase in write sub-portions.

In addition, while the foregoing generally describes the encoded data portion 304 as being a user sector that is encoded with a coding scheme comprising an ECC of a channel for writing the user sector to memory portions in a drive, it may be appreciated that other coding may also be utilized. That is, while in one example, the encoded data portion 304 may comprise an encoded user sector, in other examples, the encoded data portion 304 may comprise some other unified encoded chuck of data created by application of a coding scheme.

One example of another coding scheme that may be utilized includes outer codes of a storage drive. In this regard, a plurality of user sectors (e.g., which themselves may be encoded using an ECC or channel coding) may be provided for encoding via the outer code. As such, the encoded data portion 304 may actually comprise an encoded data portion created by application of a coding scheme to a plurality of encoded sectors such that the encoded sectors are further encoded using the outer code. As such, the encoded data portion 304 may be any encoded data to which a coding scheme has been applied to create a unified encoded data portion. As such, the write sub-portions in the example using an outer code may actually comprise a plurality of encoded data sectors comprising a portion of the encoded data portion 304 generated using the outer code. That is, the write sub-portions may comprise a part of a unified encoded data chuck regardless of the content of the data to which the coding scheme is applied. This may include that the encoded data portion 304 that is divided into a plurality of write sub-portions may itself comprise encoded data that is encoded at a lower level than the coding scheme used to create the coded data portion 304.

Figure 4:
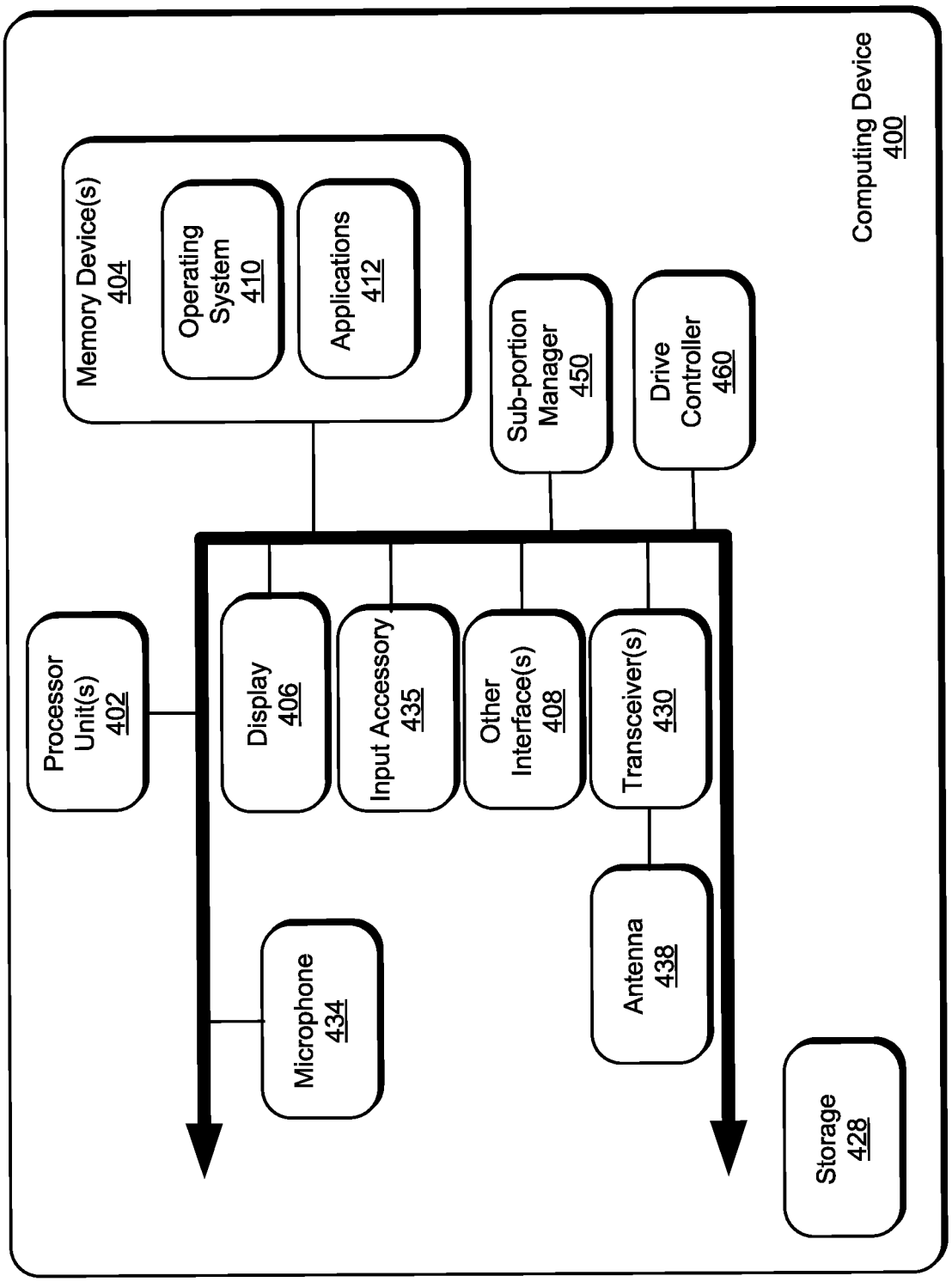
FIG. 4 illustrates an example of a computing device for execution of aspects of the present disclosure.

FIG. 4 illustrates an example schematic of a computing device 400 suitable for implementing aspects of the disclosed technology including a portion manager 450 or drive controller 460 as described above. The computing device 400 includes one or more processor unit(s) 402, memory 404, a display 406, and other interfaces 408 (e.g., buttons). The memory 404 generally includes both volatile memory (e.g., RAM) and non-volatile memory (e.g., flash memory). An operating system 410, such as the Microsoft Windows® operating system, the Apple macOS operating system, or the Linux operating system, resides in the memory 404 and is executed by the processor unit(s) 402, although it should be understood that other operating systems may be employed.

One or more applications 412 are loaded in the memory 404 and executed on the operating system 410 by the processor unit(s) 402. Applications 412 may receive input from various input local devices such as a microphone 434, input accessory 435 (e.g., keypad, mouse, stylus, touchpad, joystick, instrument mounted input, or the like). Additionally, the applications 412 may receive input from one or more remote devices such as remotely located smart devices by communicating with such devices over a wired or wireless network using more communication transceivers 430 and an antenna 438 to provide network connectivity (e.g., a mobile phone network, Wi-Fi®, Bluetooth®). The computing device 400 may also include various other components, such as a positioning system (e.g., a global positioning satellite transceiver), one or more accelerometers, one or more cameras, an audio interface (e.g., the microphone 434, an audio amplifier and speaker and/or audio jack), and storage devices 428. Other configurations may also be employed.

The computing device 400 further includes a power supply 416, which is powered by one or more batteries or other power sources, and which provides power to other components of the computing device 400. The power supply 416 may also be connected to an external power source (not shown) that overrides or recharges the built-in batteries or other power sources.

In an example implementation, the computing device 400 comprises hardware and/or software embodied by instructions stored in the memory 404 and/or the storage devices 428 and processed by the processor unit(s) 402. The memory 404 may be the memory of a host device or of an accessory that couples to the host. Additionally or alternatively, the computing device 400 may comprise one or more field programmable gate arrays (FGPAs), application specific integrated circuits (ASIC), or other hardware/software/firmware capable of providing the functionality described herein.

The computing device 400 may include a variety of tangible processor-readable storage media and intangible processor-readable communication signals. Tangible processor-readable storage can be embodied by any available media that can be accessed by the computing device 400 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 400. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method of storage of data on a storage drive for improved composite aerial density capability (ADC) relative to a plurality of media surfaces. The method includes encoding a data portion into an encoded data portion using a coding scheme. The method includes dividing the encoded data portion into a plurality of write sub-portions and writing each of the plurality of write sub-portions onto different respective media surfaces of the storage drive. The different respective media surfaces of the storage drive comprise different quality characteristics supporting different ADCs. The method further includes reading a plurality of read sub-portions from the different respective media surfaces of the storage drive and combining the plurality of read sub-portions to generate a recreated encoded data portion. In turn, the method includes decoding the recreated encoded data portion using the coding scheme.

Implementations may include one or more of the following features. For example, the method may include determining a composite failure rate of the different respective media surfaces based on a combined decoding performance of the different respective media surfaces from which the plurality of read sub-portions are read. Additionally, the method may include identifying an optimum ADC of each of the different respective media surfaces based on the composite failure rate.

In an example, the writing operation may target specific ones of the different respective media surfaces based on known different respective ADCs of the different respective media surfaces. For example, characteristics of the plurality of write sub-portions may be used to target respective ones of the plurality of write sub-portions to different respective media surfaces. As an example, a first write sub-portion with a first bit sequence may be written to a first media surface with a first ADC and a second write sub-portion with a second bit sequence may be written to a second media surface with a second ADC. The first bit sequence may be more difficult to decode than the second bit sequence using the coding scheme. Accordingly, the first media surface and the second media surface may be selected based on the first bit sequence, the second bit sequence, a quality characteristics of the first media surface, and a quality characteristics of the second media surface. For example, the first bit sequence may be written to the first media surface based on the first media surface having a lower bit error rate (e.g., by having a lower ADC) and the second bit sequence may be written to the second media surface based on the second media surface having a higher bit error rate (e.g., by having a higher ADC).

In an example, the writing each of the plurality of write sub-portions onto different respective media surfaces of the storage drive may use a corresponding number of respective write heads of the storage drive occur in an at least partially overlapping time period.

In an example, the coding scheme may include an error correction code for a channel of the storage drive. In this example, the data portion may be a data sector. In another example, the coding scheme may be an outer code of the storage drive. In this example, the data portion comprises a plurality of data sectors (e.g., that are in turn encoded into a unitary encoded portion using the outer code).

Another general aspect includes a storage drive with storage of data for improved composite aerial density capability (ADC). The storage drive includes a plurality of different media surface of the storage drive comprising different quality characteristics supporting different ADCs. The storage drive also includes a plurality of different media surfaces on which separate storage operations are performed with respect to different ones of the plurality of media surfaces. The storage drive includes an encoder for application of a coding scheme to a data portion to generate an encoded data portion. Furthermore, the storage drive includes a sub-portion manager operative to divide the encoded data portion into a plurality of write sub-portions for writing the write sub-portions to different respective media surfaces of the plurality of different media surfaces and reading a corresponding plurality of read sub-portions from the different respective media surfaces of the plurality of different media surfaces. The sub-portion manager may also be operable for combining the plurality of read sub-portions to generate a recreated encoded data portion. The storage drive may further include a decoder for decoding the recreated encoded data portion using the coding scheme.

Implementations may include one or more of the following features. For example, the storage drive may also include a drive controller that is operative to determine a composite failure rate of the plurality of different media surfaces based on a combined decoding performance of the plurality of different media surfaces from which the plurality of read sub-portions are read. The drive controller may also identify an optimum ADC of each of the different media surfaces based on the composite failure rate.

In an example, the sub-portion manager may target writing of specific ones of the different respective media surfaces based on known different respective ADCs of the different respective media surfaces. For instance, the sub-portion manager may utilize characteristics of the plurality of write sub-portions to target respective ones of the plurality of write sub-portions to different respective media surfaces. In an example, the sub-portion manager may write a first write sub-portion with a first bit sequence to a first media surface with a first ADC and may write a second write sub-portion with a second bit sequence may be written to a second media surface with a second ADC. The first bit sequence may be more difficult to decode than the second bit sequence using the coding scheme. Accordingly, the sub-portion manager may select the first media surface and the second media surface based on the first bit sequence, the second bit sequence, a quality characteristics of the first media surface, and a quality characteristics of the second media surface. For example, the first bit sequence may be written to the first media surface based on the first media surface having a lower bit error rate (e.g., by having a lower ADC) and the second bit sequence may be written to the second media surface based on the second media surface having a higher bit error rate (e.g., by having a higher ADC).

In an example, the storage drive may also include a plurality of actuators corresponding to the plurality of different media surfaces that are operative to perform independent storage operations on different respective media surfaces of the plurality of different media surfaces. For example, the plurality of actuators may perform independent storage operations in an at least partially overlapping time period.

In an example, the coding scheme may include an error correction code for a channel of the storage drive. In this example, the data portion may be a data sector. In another example, the coding scheme may include an outer code of the storage drive. In this example, the data portion comprises a plurality of data sectors.

Another general aspect of the present disclosure includes one or more tangible processor-readable storage media embodied with instructions for executing on one or more processors of a device a process for storage of data for improved composite aerial density capability (ADC). The process includes encoding a data portion into an encoded data portion using a coding scheme. The process also includes dividing the encoded data portion into a plurality of write sub-portions and writing each of the plurality of write sub-portions onto different respective media surfaces of the storage drive. The different respective media surfaces of the storage drive comprise different quality characteristics supporting different ADCs. The process also includes reading a plurality of read sub-portions from the different respective media surfaces of the storage drive and combining the plurality of read sub-portions to generate a recreated encoded data portion. The process further includes decoding the recreated encoded data portion using the coding scheme.

Implementations may include one or more of the following features. For example, the process may also include determining a composite failure rate of the different respective media surfaces based on a combined decoding performance of the different respective media surfaces from which the plurality of read sub-portions are read. In addition, the process may include identifying an optimum ADC of each of the different respective media surfaces based on the composite failure rate.

In an example, the writing operation may target specific ones of the different respective media surfaces based on known different respective ADCs of the different respective media surfaces. For example, characteristics of the plurality of write sub-portions may be used to target respective ones of the plurality of write sub-portions to different respective media surfaces.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of storage of data on a storage drive for improved composite aerial density capability (ADC) relative to a plurality of media surfaces, comprising:
   encoding a data portion into an encoded data portion using a coding scheme;
   dividing the encoded data portion into a plurality of write sub-portions;
   writing each of the plurality of write sub-portions onto different respective media surfaces of the storage drive, wherein the different respective media surfaces of the storage drive comprise different quality characteristics supporting different ADCs;
   reading a plurality of read sub-portions from the different respective media surfaces of the storage drive;
   combining the plurality of read sub-portions to generate a recreated encoded data portion; and
   decoding the recreated encoded data portion using the coding scheme.

2. The method of claim 1, further comprising:
   determining a composite failure rate of the different respective media surfaces based on a combined decoding performance of the different respective media surfaces from which the plurality of read sub-portions are read; and
   identifying an optimum ADC of each of the different respective media surfaces based on the composite failure rate.

3. The method of claim 1, wherein the writing operation targets specific ones of the different respective media surfaces based on known different respective ADCs of the different respective media surfaces.

4. The method of claim 3, wherein characteristics of the plurality of write sub-portions are used to target respective ones of the plurality of write sub-portions to different respective media surfaces.

5. The method of claim 4, wherein a first write sub-portion with a first bit sequence is written to a first media surface with a first ADC and a second write sub-portion with a second bit sequence is written to a second media surface with a second ADC, wherein the first bit sequence is more difficult to decode than the second bit sequence using the coding scheme, and wherein the first media surface and the second media surface are selected based on the first bit sequence, the second bit sequence, a quality characteristics of the first media surface, and a quality characteristics of the second media surface.

6. The method of claim 1, wherein the writing each of the plurality of write sub-portions onto different respective media surfaces of the storage drive using a corresponding number of respective write heads of the storage drive occur in an at least partially overlapping time period.

7. The method of claim 1, wherein the coding scheme comprises an error correction code for a channel of the storage drive, and wherein the data portion comprises a data sector.

8. The method of claim 1, wherein the coding scheme comprises an outer code of the storage drive, and wherein the data portion comprises a plurality of data sectors.

9. A storage drive with storage of data for improved composite aerial density capability (ADC), the storage drive comprising:
  a plurality of different media surface of the storage drive comprising different quality characteristics supporting different ADCs;
  a plurality of different media surfaces on which separate storage operations are performed with respect to different ones of the plurality of media surfaces;
  an encoder for application of a coding scheme to a data portion to generate an encoded data portion;
  a sub-portion manager operative to divide the encoded data portion into a plurality of write sub-portions for:
    writing the write sub-portions to different respective media surfaces of the plurality of different media surfaces,
    reading a corresponding plurality of read sub-portions from the different respective media surfaces of the plurality of different media surfaces, and
    combining the plurality of read sub-portions to generate a recreated encoded data portion; and
  a decoder for decoding the recreated encoded data portion using the coding scheme.

10. The storage drive of claim 9, further comprising:
  a drive controller operative to determine a composite failure rate of the plurality of different media surfaces based on a combined decoding performance of the plurality of different media surfaces from which the plurality of read sub-portions are read and identify an optimum ADC of each of the different media surfaces based on the composite failure rate.

11. The storage drive of claim 9, wherein the sub-portion manager targets writing of specific ones of the different respective media surfaces based on known different respective ADCs of the different respective media surfaces.

12. The storage drive of claim 11, wherein the sub-portion manager utilizes characteristics of the plurality of write sub-portions to target respective ones of the plurality of write sub-portions to different respective media surfaces.

13. The storage drive of claim 12, wherein the sub-portion manager writes a first write sub-portion with a first bit sequence to a first media surface with a first ADC and writes a second write sub-portion with a second bit sequence is written to a second media surface with a second ADC, wherein the first bit sequence is more difficult to decode than the second bit sequence using the coding scheme, and wherein the first media surface and the second media surface are selected based on the first bit sequence, the second bit sequence, a quality characteristics of the first media surface, and a quality characteristics of the second media surface.

14. The storage drive of claim 9, further comprising:
  a plurality of actuators corresponding to the plurality of different media surfaces that are operative to perform independent storage operations on different respective media surfaces of the plurality of different media surfaces in an at least partially overlapping time period.

15. The storage drive of claim 9, wherein the coding scheme comprises an error correction code for a channel of the storage drive, and wherein the data portion comprises a data sector.

16. The storage drive of claim 9, wherein the coding scheme comprises an outer code of the storage drive, and wherein the data portion comprises a plurality of data sectors.

17. One or more non-transitory processor-readable storage media embodied with instructions for executing on one or more processors of a device a process for storage of data for improved composite aerial density capability (ADC), comprising:
  encoding a data portion into an encoded data portion using a coding scheme;
  dividing the encoded data portion into a plurality of write sub-portions;
  writing each of the plurality of write sub-portions onto different respective media surfaces of the storage drive, wherein the different respective media surfaces of the storage drive comprise different quality characteristics supporting different ADCs;
  reading a plurality of read sub-portions from the different respective media surfaces of the storage drive;
  combining the plurality of read sub-portions to generate a recreated encoded data portion; and
  decoding the recreated encoded data portion using the coding scheme.

18. The one or more non-transitory processor-readable storage media of claim 17, wherein the process further comprises:
  determining a composite failure rate of the different respective media surfaces based on a combined decoding performance of the different respective media surfaces from which the plurality of read sub-portions are read; and
  identifying an optimum ADC of each of the different respective media surfaces based on the composite failure rate.

19. The one or more non-transitory processor-readable storage media of claim 17, the writing operation targets specific ones of the different respective media surfaces based on known different respective ADCs of the different respective media surfaces.

20. The one or more non-transitory processor-readable storage media of claim 17, wherein characteristics of the plurality of write sub-portions are used to target respective ones of the plurality of write sub-portions to different respective media surfaces.

* * * * *